Dec. 31, 1957  R. L. SINCLAIR  2,818,186
VEHICLE PARKING APPARATUS
Filed Aug. 5, 1954  2 Sheets-Sheet 1
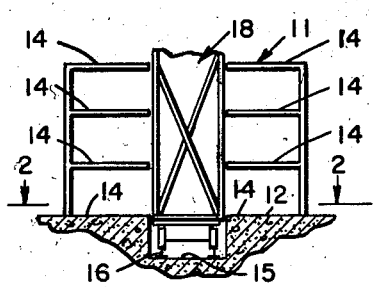
FIG. 1.
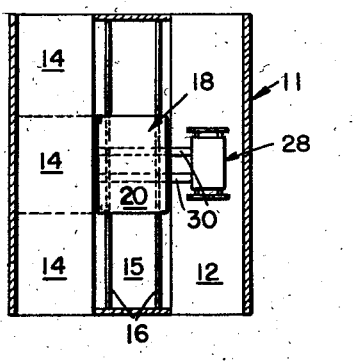
FIG. 2.
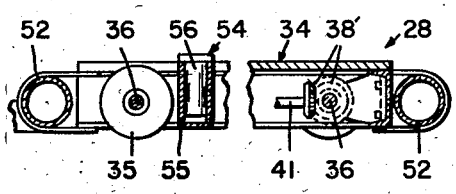
FIG. 5.
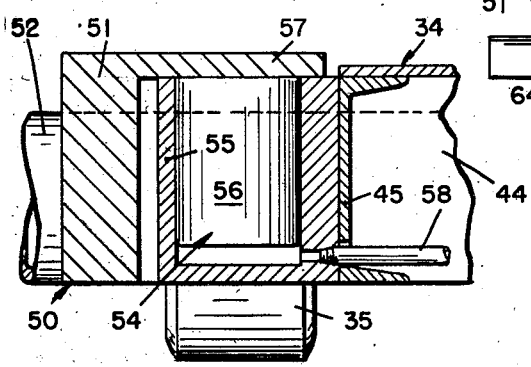
FIG. 6.
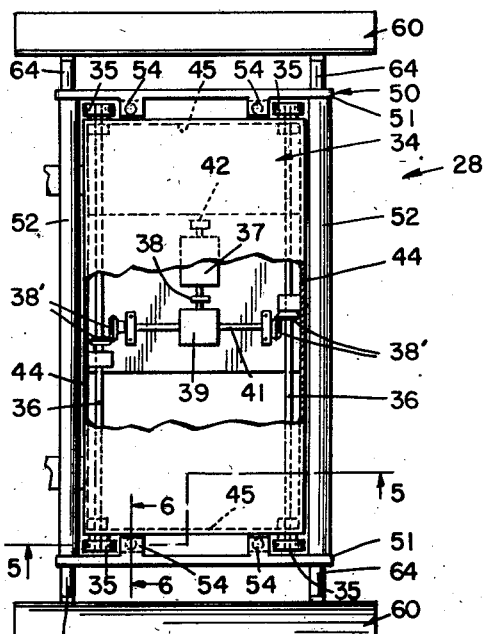
FIG. 3.
FIG. 4.
INVENTOR
RICHARD L. SINCLAIR
BY
Mason & Graham
ATTORNEYS Dec. 31, 1957  R. L. SINCLAIR  2,818,186
VEHICLE PARKING APPARATUS
Filed Aug. 5, 1954  2 Sheets-Sheet 2

INVENTOR
RICHARD L. SINCLAIR
BY
*Mason & Graham*
ATTORNEYS

United States Patent Office 2,818,186
Patented Dec. 31, 1957

2,818,186

VEHICLE PARKING APPARATUS

Richard L. Sinclair, Anaheim, Calif.

Application August 5, 1954, Serial No. 447,951

2 Claims. (Cl. 214—331)

This invention has to do with apparatus for handling motor vehicles in parking areas and structures for the purpose of moving the vehicles into and out of parking areas or stalls.

An object of the invention is to provide a novel method and means for efficiently parking motor vehicles and a structure for receiving the vehicles.

A particular object of the invention is to provide apparatus embodying a mobile elevator or crane-elevator mounted for horizontal travel along a given path and a structure providing parking areas or stalls parallel to the line of horizontal travel of the elevator together with means for moving motor vehicles sideways onto and off of the elevator and into and out of parking areas.

Another object of the invention is to provide novel apparatus for elevating and moving a motor vehicle and in particular a dolly adapted to move under a motor vehicle and elevate the same for movement.

A particular object is to provide a novel dolly construction embodying novel means for engaging and raising a motor vehicle or the like.

These and other objects will be apparent from the drawings and the following description. Referring to the drawing:

Fig. 1 is a schematic view of the end of a parking structure and apparatus;

Fig. 2 is a sectional plan view of the structure on line 2—2 of Fig. 1;

Fig. 3 is a schematic side elevational view of the elevator;

Fig. 4 is a plan view, partially broken away, of a dolly or truck embodying the invention;

Fig. 5 is a sectional view on line 5—5 of Fig. 4, on a larger scale;

Fig. 6 is a fragmentary enlarged sectional view on line 6—6 of Fig. 4;

Figure 7:
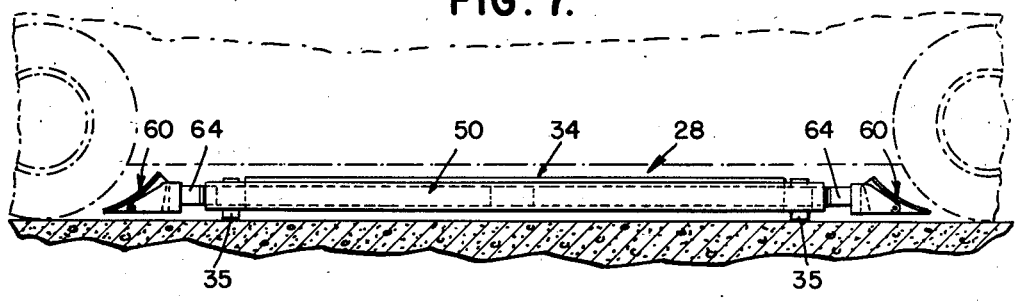
Fig. 7 is a side elevational view of the apparatus shown in position under a motor vehicle.

More particularly describing the invention, in Figs. 1 and 2, which are largely schematic, I illustrate a parking structure or garage 11 which has a ground floor 12. The structure provides parking areas 14 at different levels one above the other upon each side of and parallel to a central pit 15 in which are positioned rails 16 for supporting a traveling elevator or crane-elevator 18. The elevator is self-propelled and has a platform 20 adapted to be elevated and lowered in any conventional manner so as to position the upper surface thereof coplanar with any of the surfaces 14 or the ground floor 12. The platform may be rotatable or in the nature of a turntable, if desired. Since the construction of the elevator forms no part of the invention, I have merely illustrated this diagrammatically and have shown cables 21 attached to the platform passing over sheaves 22 and 23 for operation by a suitable motor and pulley means 34. The same or a separate motor may be used for effecting horizontal travel of the elevator through a conventional drive train.

A particular feature of the invention is that in handling motor vehicles they are moved sideways onto and off of the elevator by means of a dolly or truck, generally indicated by 28. This dolly is adapted to be positioned on the elevator platform 20 and may be connected thereto for straight-line movement off the platform to either side by means of suitable telescoping guide rails or the like which are indicated by 30 in Fig. 2. These may be of any conventional construction.

Dolly 28 comprises a main frame 34 which carries wheels 35 and these are fixedly mounted upon axles 36 which may be journaled in any conventional manner on or in the main frame. The axles are shown as driven in either direction by a reversible motor 37 through a clutch or fluid coupling 38 and a gear reduction means 39. The latter drives a cross shaft 41 and this and the shafts 36 carry meshing pinions 38'. Any suitable means may be provided for controlling the motor and for operating a brake, indicated at 42.

The dolly is thus self-propelled for movement off of the elevator platform and for return movement thereunto. However, I contemplate that means may be provided on the elevator for extending and retracting the dolly, and it is thus not essential that the dolly have its own motor.

The main frame is shown as rectangular, having side members 44 and end members 45. Carried on the main frame is a secondary frame or assembly, generally indicated by 50, which normally surrounds the main frame. This includes end members 51 and side members 52. The latter are in the form of cylinders for a purpose which will later be described.

I prefer to mount the secondary frame 50 upon the main frame 34 in a manner such that, if occasion should require it, the secondary frame can be elevated a few inches. This is accomplished by providing four fluid jacks 54, shown as comprising cylinders 55 mounted on end members 45 of the main frame and pistons 56 mounted on shelves 57 integral with the end members 51 of the secondary frame. The jacks can be supplied with fluid under pressure through conduits 58 by any conventional means. Also, motor-driven screw jacks can be used in place of those shown.

A particular feature of the invention is the provision of means for engaging the wheels of a motor vehicle and raising the vehicle by its wheels, and this means comprises a pair of vehicle wheel-engaging members or shoes 60, one at each end of the dolly. These are preferably plates having concave outer surfaces 61 curved to a radius approximating that of an average-size vehicle tire. Each of the members 60 is carried upon the free or projecting ends of pistons 64 received in the cylinders 52, there being two such pistons for each cylinder.

Preferably the plates 60 are pivotally mounted for limited movement about a horizontal axis upon the pistons and each plate is shown as having a rearwardly projecting mounting tongue 63 adjacent each end which receives a pin 63a mounted in a bifurcated bracket 65 provided on the outer end of each piston. A compression coil spring 67, provided in a bore 68 in each tongue 63, bears against head portion 69 of the bracket 65, serving to bias the shoe or plate to the position in which it is shown in Fig. 9. The shape of the tongue is such, as appears from Figs. 8 and 9, as to permit limited pivotal movement of the shoe.

In the operation of the dolly, the device is run underneath a motor vehicle to the approximate position in which it is shown in Fig. 7 after which the vehicle wheel-engaging shoe members are extended into engagement with the wheels of the vehicle. Further movement of the shoes serves to elevate the vehicle as shown in Fig. 9 as the wheel-engaging members are forced part way under the wheels. In this connection it should be noted that as the wheel-engaging members move from the position of Fig. 7 to that of Fig. 8 they pivot to conform to the curvature of the wheels.

The dolly may then be moved to transport the vehicle onto the platform of the elevator and the elevator operated to move the same to position the platform opposite the desired parking area. The dolly is then run off the elevator into the parking area and the vehicle-engaging members are retracted to lower the automobile. The dolly may then be returned to the elevator.

Figure 8:
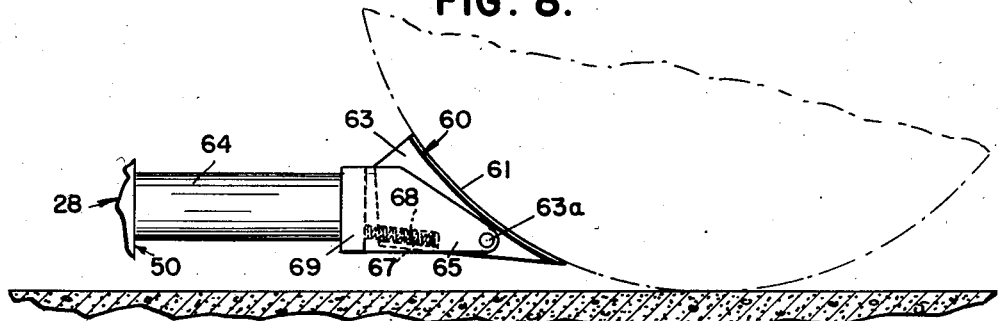
Fig. 8 is a view, partially in section, on an enlarged scale, showing a vehicle-engaging member in engagement with a vehicle wheel.
Figure 9:
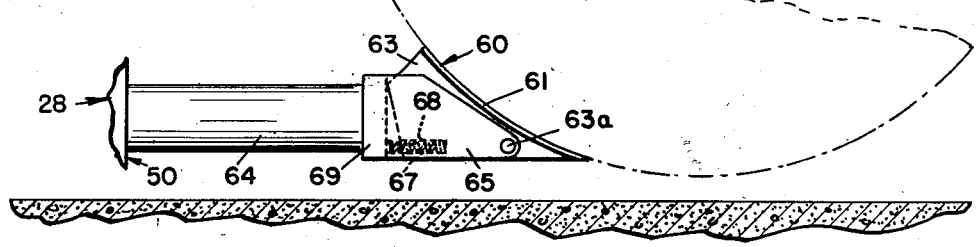
Fig. 9 is a view of the same parts shown in Fig. 8 in extended, vehicle-raising position.

In some cases it may be desirable to elevate the entire secondary frame of the dolly after the wheel-engaging members have moved to the approximate position of Fig. 8 but have not moved sufficiently far to actually raise the vehicle. This is accomplished by actuating the jacks 54. Any suitable conventional fluid pressure means may be used to accomplish this.

Figures 10, 11:
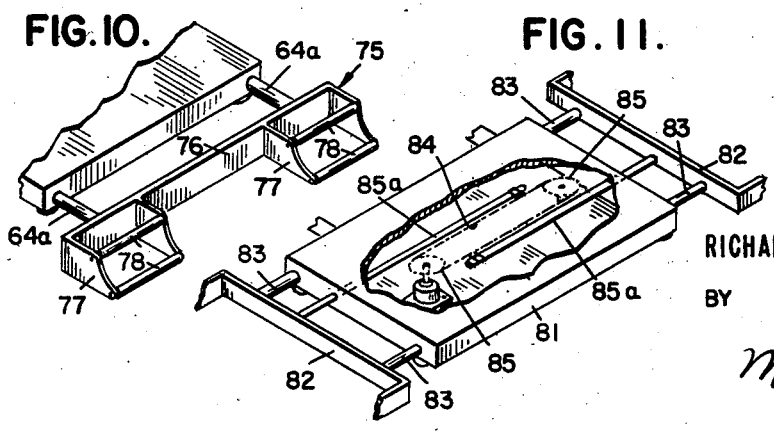
Fig. 10 is a perspective view of an alternate form of wheel-engaging member.
Fig. 11 is a schematic view of a modified form of device.

If desired, anti-friction means, such as rollers, may be employed on the wheel-engaging members for engagement with the wheels of the motor vehicles. In Fig. 10 I show an alternate type of wheel-engaging member, indicated by 75. This comprises a main cross member 76 mounted on the ends of pistons 64a. This carries a pair of brackets 77 each of which supports a pair of rollers 78 for engaging the tire of a motor vehicle. If desired, each pair of rollers may be mounted for limited horizontal pivotal movement as a unit, or the entire wheel-engaging assembly mounted for such movement in much the same way as the wheel-engaging member 60.

In Fig. 11 I show schematically another form of dolly. This has a wheeled frame 81. Wheel-engaging members 82 are supported on pairs of longitudinally slidable beams 83 carried by the frame. A chain 84 which extends around sprockets 85 is used for extending and retracting the members 82 by means of connecting rods or bars 85a which are each connected at one end to a member 82 and at the other end to the chain. Any suitable means may be used for actuating the chain. The operation of this device is substantially the same as the one previously described.

Although I have illustrated and described a preferred form of my invention, I contemplate that various changes and modifications can be made therein without departing from the invention, the scope of which is indicated by the following claims.

I claim:

1. A self-propelled dolly for use in handling motor vehicles, comprising a main frame, ground-engaging wheels on said main frame for movement of said frame laterally, power means carried by said main frame operatively connected to drive said wheels, a secondary frame, vertically movable jack means carried by said main frame and supporting said secondary frame, said frames being telescopically arranged with said secondary frame receiving said main frame, an elongated vehicle wheel-engaging member at each end of said secondary frame, means mounting said vehicle wheel-engaging members for movement horizontally outward of the ends of said secondary frame in a direction normal to the direction of movement of said device on said wheels, and power-operated means for effecting movement of said wheel-engaging members.

2. A dolly as set forth in claim 1 in which the power-operated means for effecting movement of said wheel-engaging members comprises a pair of parallel, laterally spaced cylinders on said secondary frame and a pair of pistons secured to each vehicle-engaging member and extending into said cylinders.

References Cited in the file of this patent

UNITED STATES PATENTS

| | | |
|---|---|---|
| 1,584,080 | Dinkelberg | May 11, 1926 |
| 1,584,517 | Dinkelberg | May 11, 1926 |
| 2,223,962 | Mitchell | Dec. 3, 1940 |
| 2,369,603 | Phillips | Feb. 13, 1945 |
| 2,626,065 | Sanders et al. | Jan. 20, 1953 |
| 2,647,647 | Alimanestiano | Aug. 4, 1953 |

FOREIGN PATENTS

| | | |
|---|---|---|
| 728,493 | Germany | Nov. 7, 1942 |
| 281,626 | Switzerland | July 1, 1952 |